US010311026B2

(12) United States Patent
Constantinescu et al.

(10) Patent No.: US 10,311,026 B2
(45) Date of Patent: Jun. 4, 2019

(54) COMPRESSED DATA LAYOUT FOR OPTIMIZING DATA TRANSACTIONS

(71) Applicant: International Business Machines Corporation, Armonk, NY (US)

(72) Inventors: M. Corneliu Constantinescu, San Jose, CA (US); Leo Shyh-Wei Luan, Saratoga, CA (US); Wayne A. Sawdon, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 15/167,277

(22) Filed: May 27, 2016

(65) Prior Publication Data

US 2017/0344578 A1 Nov. 30, 2017

(51) Int. Cl.

*G06F 16/00* (2019.01)
*G06F 16/174* (2019.01)
*G06F 16/17* (2019.01)

(52) U.S. Cl.

CPC ...... *G06F 16/1744* (2019.01); *G06F 16/1727* (2019.01)

(58) Field of Classification Search

CPC ......... G06F 17/30153; G06F 17/30138; G06F 16/1744; G06F 16/1727
USPC .......................................................... 707/693
See application file for complete search history.

(56) References Cited

U.S. PATENT DOCUMENTS

| | | | | |
|---|---|---|---|---|
| 5,200,864 | A | 4/1993 | Dunn et al. | |
| 5,237,675 | A | 8/1993 | Hannon, Jr. | |
| 5,627,995 | A | 5/1997 | Miller et al. | |
| 5,701,459 | A * | 12/1997 | Millett | G06F 17/30625 |
| 5,729,228 | A * | 3/1998 | Franaszek | G06T 9/005 341/106 |
| 5,870,036 | A * | 2/1999 | Franaszek | H03M 7/3086 341/51 |
| 7,430,638 | B2 | 9/2008 | Kellar | |
| 2003/0135495 | A1 * | 7/2003 | Vagnozzi | G06F 17/30324 |
| 2005/0132161 | A1 * | 6/2005 | Makela | G06F 12/023 711/170 |
| 2009/0024643 | A1 * | 1/2009 | Mittal | G06F 17/30961 |

(Continued)

OTHER PUBLICATIONS

Waters, "Analysis of Self Indexing, Disc Files," The Computer Journal, vol. 18 No. 3 (1975), pp. 200-205.

(Continued)

*Primary Examiner* — Evan Aspinwall
(74) *Attorney, Agent, or Firm* — Lieberman & Brandsdorfer, LLC

(57) ABSTRACT

The embodiments described herein relate to managing compressed data to optimize file compression for efficient random access to the data. A first partition of a first data block of a compression group is compressed. The first compressed partition is stored in a first compression entity. An in-memory table is maintained, which includes updating the in-memory table with data associated with an address of the stored compressed first partition. At such time as it is determined that the first compression entity is full, the in-memory table is compressed and written to the first compression entity. Accordingly, the in-memory table, which stores partition compression data, is store with the compression entity.

20 Claims, 9 Drawing Sheets

(56) References Cited

U.S. PATENT DOCUMENTS

| | | | | |
|---|---|---|---|---|
| 2011/0087840 | A1* | 4/2011 | Glasco | G06F 12/08 711/118 |
| 2013/0232176 | A1* | 9/2013 | Plattner | G06F 17/30289 707/803 |
| 2015/0074066 | A1* | 3/2015 | Li | G06F 17/30315 707/693 |
| 2015/0178305 | A1* | 6/2015 | Mueller | G06F 17/30129 707/693 |
| 2015/0286668 | A1* | 10/2015 | Legler | G06F 17/30345 707/736 |
| 2017/0116280 | A1* | 4/2017 | Shergill, Jr. | G06F 17/30336 |

OTHER PUBLICATIONS

Lin, "Variable-Sized Object Packing and Its Applications to Instruction Cache Design," Computers and Electrical Engineering, 34 (2008), pp. 438-444.

Li et al., "Performance of Key Features and Interfaces in DryadILINQ CTP," SALSA Group, Pervasive Technology Institute, Indiana University, (Dec. 13, 2011).

* cited by examiner

COMPRESSED DATA LAYOUT FOR OPTIMIZING DATA TRANSACTIONS

BACKGROUND

The embodiments described herein relate to data compression. More specifically, the embodiments relate to compressing data for optimizing random file access.

File systems organize data into files, with each file representative of a number of blocks of a size, and each block representative of a continuous set of bytes. In compression enabled file systems file compression is performed on "raw" file data to create "compressed" file data. File compression is performed to reduce the number of blocks required to store data of the file. For larger files, it may be desirable to compress a grouping of data blocks, rather than the entire file at once.

Different data files are known to have different compression rates. With a fixed size compression group size, some compression groups may have all of their blocks full with the compressed data utilizing the entirety of the allotted storage space, while other compression groups may have blocks that are only partially filled with compressed data, resulting in compression loss. At the same time, different compression ratios may result in at least a portion of a final compressed data block remaining unused. This unused portion, which is referred to as "internal fragmentation," results in wasted unused space in each compression group.

SUMMARY

This invention comprises a system, computer program product, and method for minimizing internal fragmentation associated with data compression.

According to one aspect, a system is provided to manage compressed data. A processing unit is in communication with memory. A functional unit with one or more tools to support data compression and reading compressed data is provided in communication with the processing unit. The tools compress a first partition of a first data block of a compression group, and store the first compressed partition a first compression entity. An in-memory table is maintained to track the data compression. The maintenance includes the tools to update the in-memory table with data associated an address of the stored first compressed partition, and in one embodiment, data associated with addresses of any subsequently compressed partitions. In response to a determination that the first compression entity is full, the in-memory table is compressed and written to the first compression entity. In one embodiment, one or more of the tools support a read request, wherein the tools employ the compressed table to locate, decompress, and return data in support of the read request.

According to another aspect, a computer program product is provided to manage compressed data. The computer program product includes a computer readable storage medium having computer readable program code embodied therewith. The program code is executable by a processor to compress a first partition of a first data block of a compression group, and store the first compressed partition a first compression entity. An in-memory table is maintained to track the data compression. The maintenance includes the tools to update the in-memory table with data associated an address of the stored first compressed partition, and in one embodiment, data associated with addresses of any subsequently compressed partitions. In response to a determination that the first compression entity is full, the in-memory table is compressed and written to the first compression entity. In one embodiment, program code supports a read request, wherein the tools employ the compressed table to locate, decompress, and return data in support of the read request.

According to yet another aspect, a method is provided for compressing data to optimize random file access. A first partition of a first data block of a compression group, and the first compressed partition is stored in a first compression entity. An in-memory table is maintained to track the data compression. The maintenance includes updating the in-memory table with data associated an address of the stored first compressed partition, and in one embodiment, data associated with addresses of any subsequently compressed partitions. In response to a determination that the first compression entity is full, the in-memory table is compressed and written to the first compression entity. In one embodiment, a read request is supported, including employing the compressed table to locate, decompress, and return data in support of the read request.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1A:
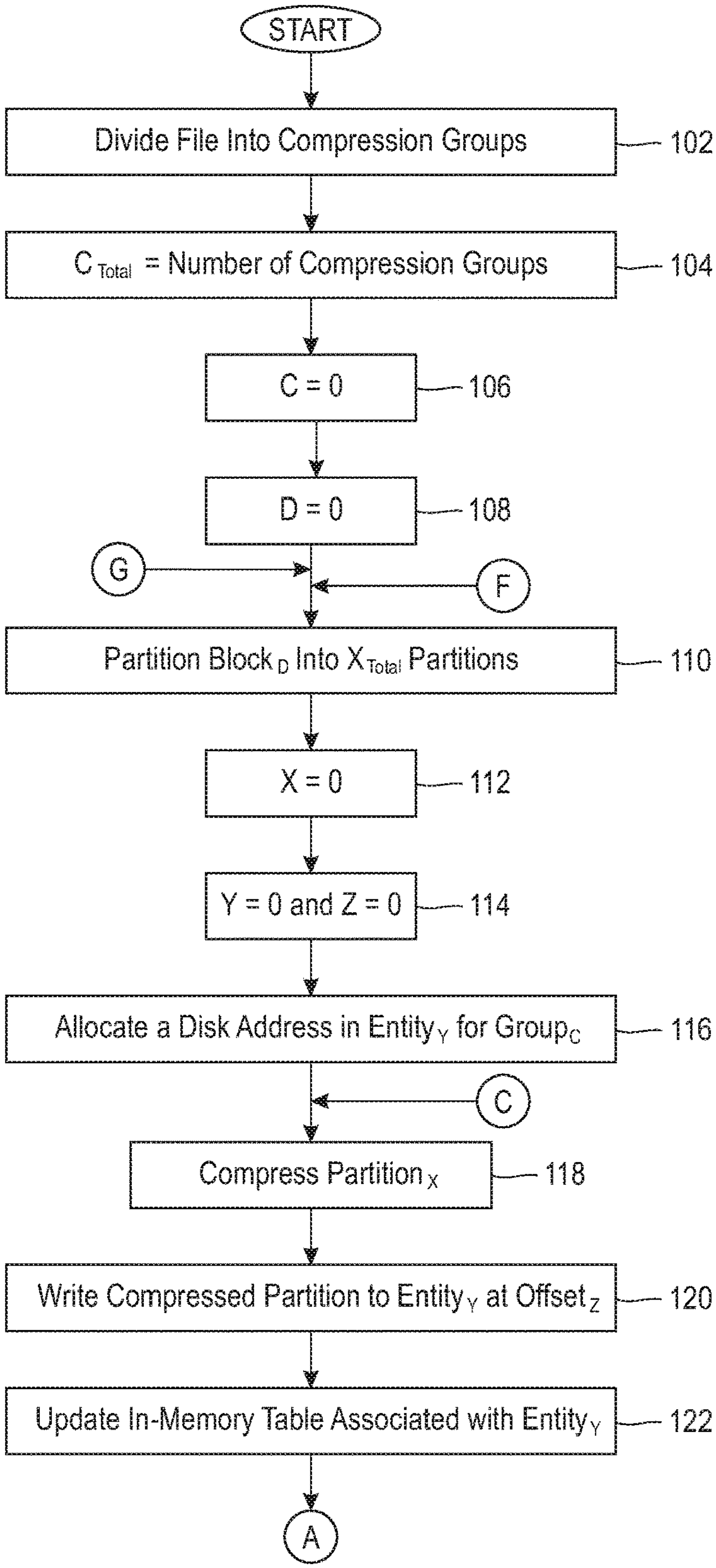
FIGS. 1A-1D depict a flow chart illustrating a method for compressing data.
Figure 1B:
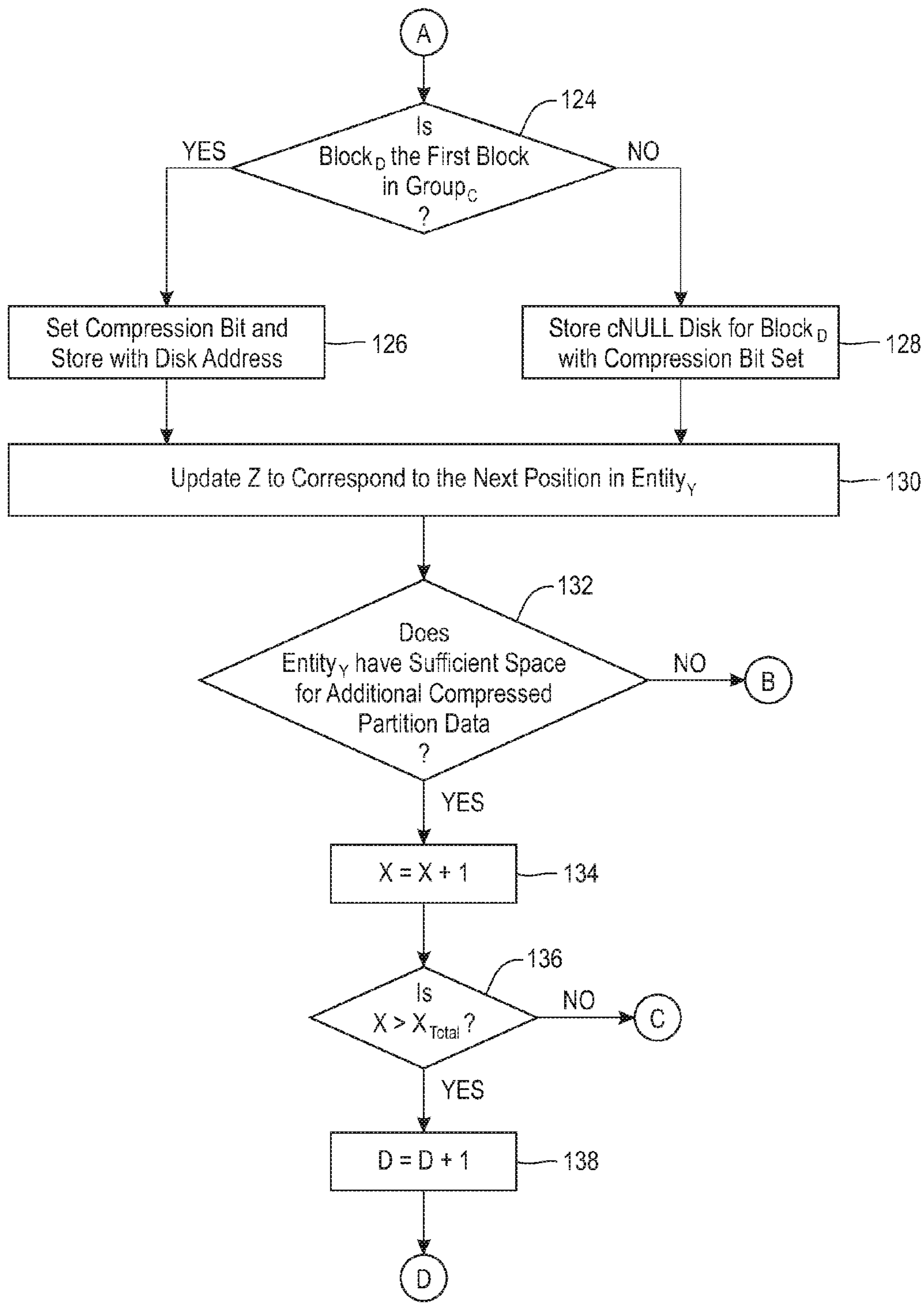
Figure 1C:
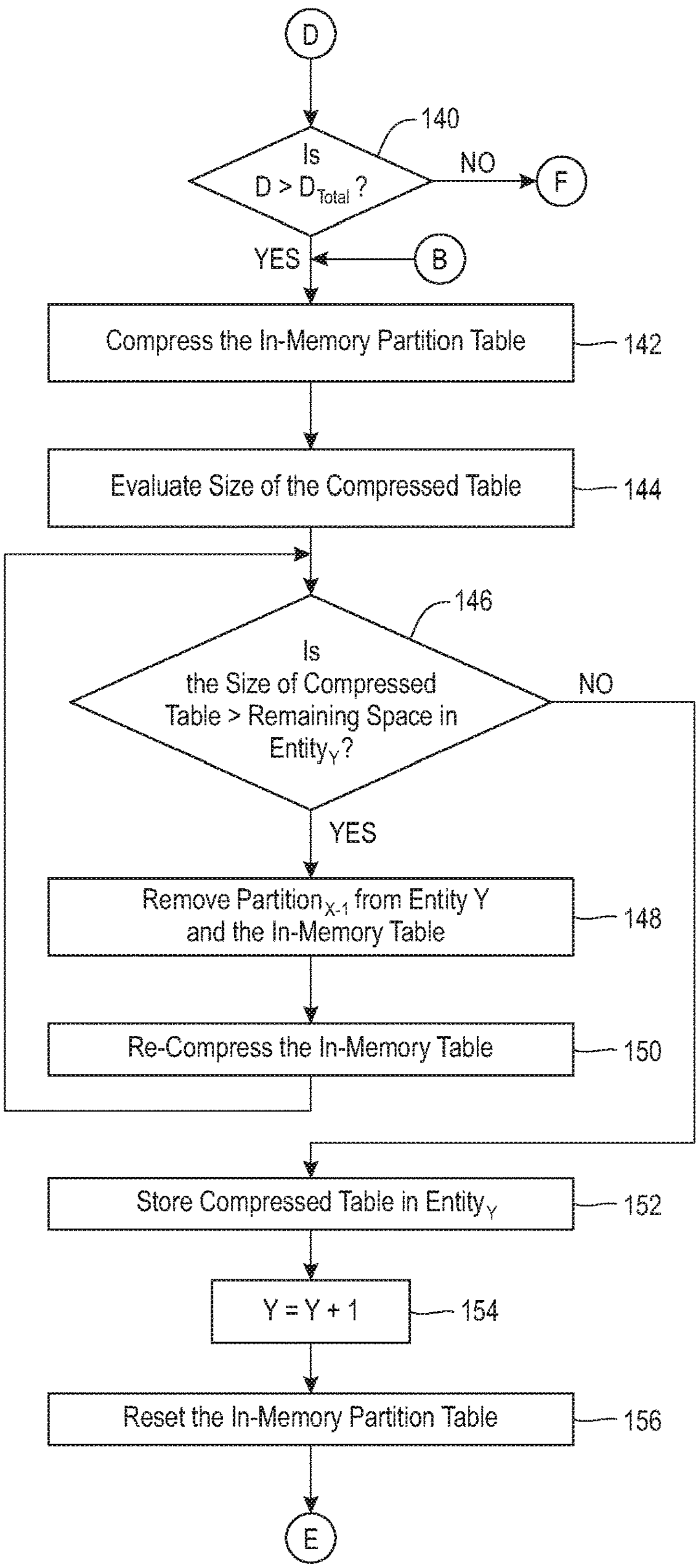
Figure 1D:
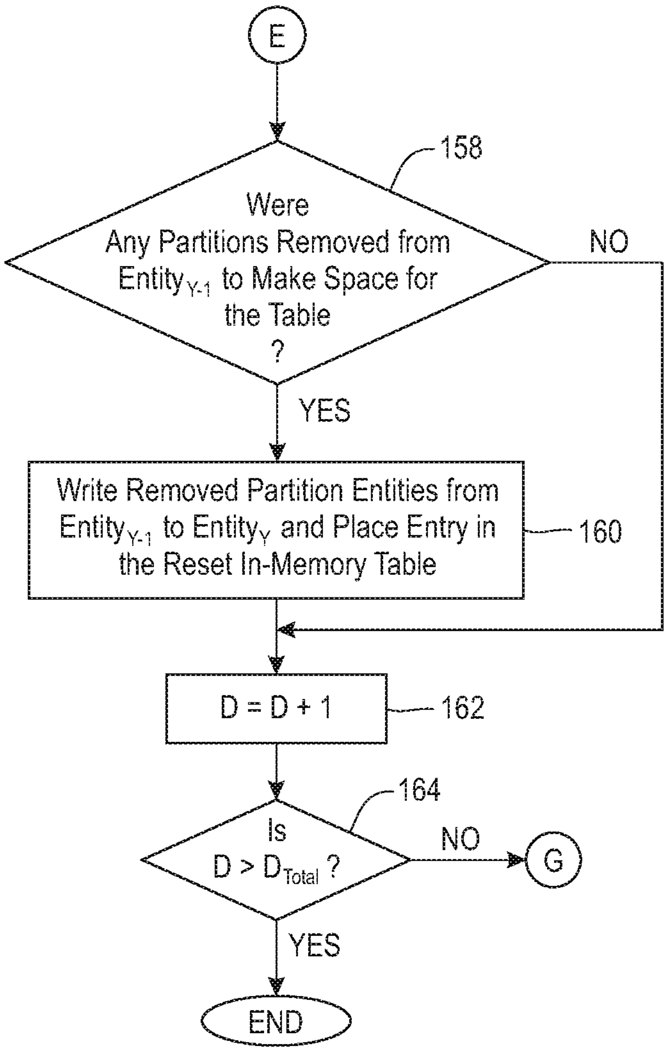

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct.

Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

As is known in the art, a file in a file system may be represented, in part, by one or more data blocks and an inode. It is understood that a data block is a contiguous set of bits or bytes that form an identifiable unit of data. An inode is a data structure that stores file information. Each file has an inode and is identified by an inode number in the file system where it resides. The inode contains the file's attributes, including owner, date, size and read/write permissions, and a pointer to the file's data location(s).

In compression, raw file data is compressed to create compressed data. This compressed data may then be stored in respective compressed data blocks. A data structure corresponding to the compressed data blocks is referred to herein as a compression entity. Compression reduces the number of blocks requires to store the data. For large files, it is desirable to compress sub-ranges of the file, rather than the entire file. These sub-ranges are referred to herein as compression groups. By compressing the file based on these sub-ranges, random read and write requests to the file are supported without requiring the entire file to be decompressed.

In one embodiment, the compression process includes a partitioning of the one or more data blocks representing the raw file. A partition is referred to herein as a continuous set of bytes within a data block, with the partition being a subset of the data block. In another embodiment, the partition size can be larger than one data block, with the data block being a subset of a partition. In one embodiment, each block is comprised of one or more data partitions, or partitions. Partition size is controlled via software, and thus may be changed on a per-file basis. Partition size is a trade-off between compressibility and random access latency. In one embodiment, the partition size is 32 KB, and in another embodiment, the partition size is 64 KB. Similarly, in one embodiment, the partition size may be less than 32 KB. In effect, the partition size is not to be considered limiting. Although a larger partition size does not significantly improve compressibility, it increases random access latency.

Referring to FIGS. 1A-1D, a flow chart (100) is provided illustrating a process for compressing a data file to a compression entity while minimizing internal fragmentation. The data file is divided into two or more compression groups (102), with $C_{Total}$ representing the quantity of compression groups resulting from the division (104). A corresponding compression group counting variable, C, is initialized (106). In one embodiment, the division at step (102) includes organizing the raw file data in each compression group into one or more data blocks. The number of data blocks for a compression group is determined based upon the compressibility of the raw file data. For example, $group_1$ may include $D_1$ blocks, $group_2$ may include $D_2$ blocks, etc.

Now that the raw file data is grouped into data blocks within respective compression groups, the compression process may commence. The compression of each data block in $group_C$ is performed on a partition basis, with compressed partition data being stored in one or more compressed data blocks, referred to herein as a compression entity. In one embodiment, a data block counting variable for $group_C$, D, is initialized (108), and $block_D$ is partitioned into one or more partitions (110), with $X_{Total}$ representing the quantity of partitions resulting from the partitioning of $block_D$. A corresponding partition counting variable associated with the $block_D$ of $group_C$, X, is initialized (112). A variable Y representing a compression entity, and a variable Z representing a position, also referred to herein as an offset in the compression entity are also initialized (114).

A disk address in $entity_Y$ is allocated for $group_C$ (116). Following the allocation, $partition_X$ is compressed (118). The compressed $partition_X$ is written to $entity_Y$ at $offset_Z$ (120). Thereafter, an in-memory table associated with $entity_Y$ is updated storing the $offset_Z$ of the compressed $partition_X$ (122). It is then determined if $block_D$ is the first block in $group_C$ (124). A positive response to the determination at step (124) is followed by the file system setting a compression bit and storing the disk address for the first block, $block_0$, with the set compression bit to indicate that it contains compressed data (126). If the $block_D$ is not the first block in $group_C$, the file system stores a cNULL (compressed NULL) disk address for $block_D$ with a compression bit set to indicate that the partition is part of $group_C$ (128). The compression bit set at step (128) is the same compression bit set for the first block of $group_C$. Accordingly, as each partition is compressed into the compression entity, both the partition table and the file system are updated to track the compression and the associated data.

As raw data is compressed and stored in $entity_Y$, the size of the table increases. The space required for storing the table is not known in advance of completion of the data block compression process. In one embodiment, the size of the table is relatively small as compared to the original file. For example, each entry in the table could cover 64 KB of the original file. However, the size of the table is dependent on the number of original file blocks. For instance, larger files may be supported by increasing the number of blocks, if desired, which corresponds to a larger table size.

Following either steps (126) or (128), the variable Z is updated so that $offset_Z$ for the next partition corresponds to the next position in the compression entity (130). It is then determined if $entity_Y$ has sufficient space to receive and store additional compressed partition data (132). In one embodiment, the size of the compression entity is limited. Similarly, in one embodiment, it may be desirable that the partitions of a compression group be compressed to the same compression entity. A positive response to the determination at step (132) is followed by incrementing the partition counting variable X (134), and determining if all of the partitions, X, in the compression group C, have been compressed (136). A negative response to the determination at step (136), is followed by a return to step (118) to compress the next partition, and store the compressed next partition into $entity_Y$. A positive response to the determination at step (136) is followed by an increment of the block counting variable, D, (138), and a determination if each of the data blocks of $group_C$ has been subject to compression (140). A negative response to the determination at step (140) is followed by a return to step (110) to partition and compress the next block of raw data. Accordingly, the process of compressing raw data continues if there is space remaining in $entity_Y$ and there is raw data remaining to be compressed.

At such time as either the compression entity is full or there are no more data blocks remaining to be compressed, as demonstrated by a negative response to the determination at step (132) and a positive response to the determination at step (140), respectively, the in-memory partition table for $entity_Y$ is compressed (142). In one embodiment, the compressed table is stored in the last entry of the compression entity, also referred to herein as a footer of the compression entity. Similarly, in one embodiment, the compressed table is stored as a header in the compression entity. In either event, in order to store the compressed table within the compression entity, a size of the compressed table is evaluated (144), and it is determined if the evaluated size exceeds the size of any space remaining in $entity_Y$ (146). The purpose of the evaluation and determination is to ensure there is sufficient space in $entity_Y$ to store the compressed table. As such, a positive response to the determination at step (146) results in the removal of $partition_{X-1}$ corresponding to the last partition from both $entity_Y$ and the partition table (148), re-compression of the partition table for $entity_Y$, (150), and a return to step (146) for evaluation of the size of the re-compressed partition table.

A negative response to the determination at step (146) is an indication that there is enough space in $entity_Y$ to store the compressed table, and the compressed table is stored in $entity_Y$ (152). At the same time, the removal of compressed partitions from compression $entity_Y$ is tracked to account for each of the partitions and their associated compression entity. Each partition that was removed from $entity_Y$ to make space for the compressed table is stored in another compression entity.

After a compression entity is full, the in-memory partition table is reset for the following compression entity. As shown herein, following step (152), the compression entity counting variable Y is incremented (154), and the in-memory partition table is reset (156). The partition counting variable X, corresponding to the compressed blocks is tracked with respect to the table compression and any partition removal. As such, following step (156), it is determined if any partitions were removed from $entity_{Y-1}$ to make space available for the compression table (158). A positive response to the determination at step (158) is followed by writing the block(s) corresponding to the removed partition entries to compression $entity_{Y+1}$ starting at zero offset, with an entry of these partitions placed in the reset partition table (160). Accordingly, each partition corresponding to a removed entry is essentially moved by copying the compressed data to another compression entity and tracking the location of the data in a corresponding compression table for the compression entity.

Either following step (160) or a negative response to the determination at step (158), the data block counting variable D is updated (162), and it is determined if there are any more data blocks subject to compression within $group_C$ (164). A negative response to the determination at step (164) is followed by a return to step (110) to partition the next data block of $group_C$, and a positive response to the determination at step (164) concludes the compression of the data blocks of $group_C$.

In an alternative embodiment, the compressed data is split for the final partition. For instance, a first portion of bytes of the compressed data, followed by the compressed partition table, may be stored in a current compression entity. The remaining portion of bytes of the compressed data may then be stored at a zero offset in the next compression entity.

The result of the process of FIGS. 1A-1D demonstrates that an in-memory partition table is updated in response to data partition compression. The compression process cycles through the partitions of one or more data blocks of a compression group until the compression entity is full, at which time a new compression entity is allocated to store further compressed partitions, or until all of the non-compressed raw data has been subject to compression. The size of the compression entity depends solely on the compressibility of the data. Regardless of the original size, each compression entity has one allocated block.

The data compression demonstrated in FIGS. 1A-1D creates dense packing compression and ensures that all compression entities, except the final compression entity, are completely full. In other words, internal fragmentation is limited, and if present such fragmentation may be limited to the last compression entity. This manner of data compression eliminates the upper bound on compression efficiency, and optimizes the balance between increasing storage efficiency and decreasing overhead in support of data transactions. In one embodiment, the overhead is nominal, and may be reduced to substantially zero, depending on the file. At the same time, not all data is compressible. Data that is not compressible is not subject to compression and is not stored in an associated compression entity. In this case, the file system will not have a compression bit set for the associated disk address. Accordingly, the file system maintains address information for compressed and non-compressed data.

Typically, a disk address is assigned to each uncompressed data block, also referred to herein as raw file data.

After compressing partitioned data of a data block, only the first block in the compression entity will have an assigned physical disk address. A bit, also referred to herein as a compression bit, is set and associated with this physical address. The remaining blocks in the compression group are each stored with a compressed NULL (cNULL) in place of the address, with the same bit set to demonstrate they are part of the same compression group. This range of blocks (i.e., the block with the physical address and the block(s) having cNULL in place of the address) together comprise a compression group. For example, in one embodiment, if the data is highly compressible, there may be one data block with an assigned physical address and multiple cNULLs with the same compression bit. Similarly, in one embodiment, the data may not be as highly compressible, and there may be one data block with an assigned physical address and only one cNULL with the same compression bit. The compressibility of the data determines the size of the compression group. Accordingly, each compression group has a corresponding compression bit set with the first physical address of the compression group.

Data that is the subject of a read request may be compressed data or non-compressed data. For data that is non-compressed, the data is returned to the caller since it is not subject to decompression. However, in order to read data that has been compressed, the compressed data must undergo a decompression process. At the same time, it is understood that for the read request, parts of the data may be non-compressed, while others parts of the data may be compressed. Accordingly, supporting a read request needs to account for the manner in which the data has been stored.

Figure 2A:
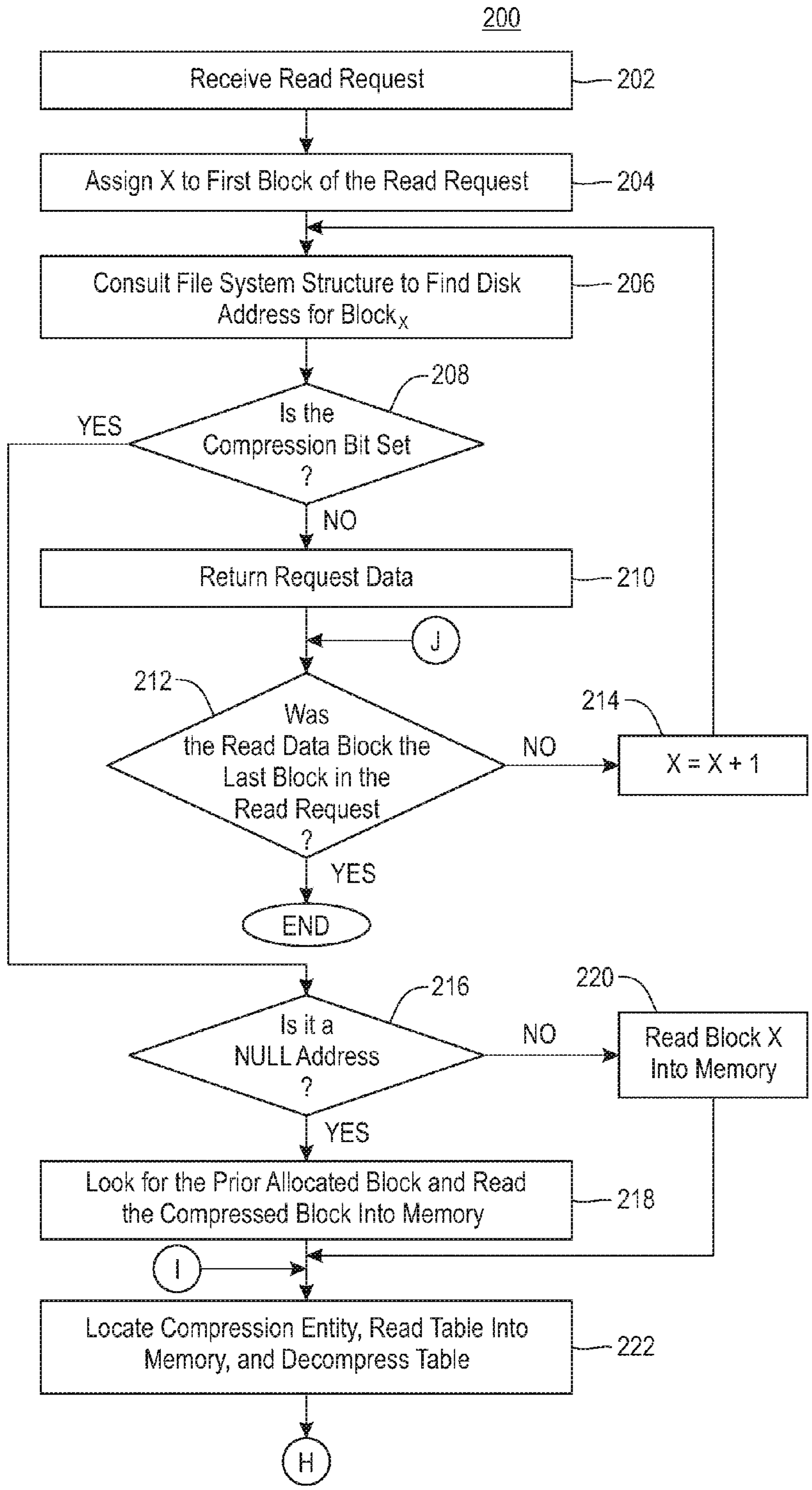
FIGS. 2A-2B depict a flow chart illustrating a method for randomly reading compressed data.
Figure 2B:
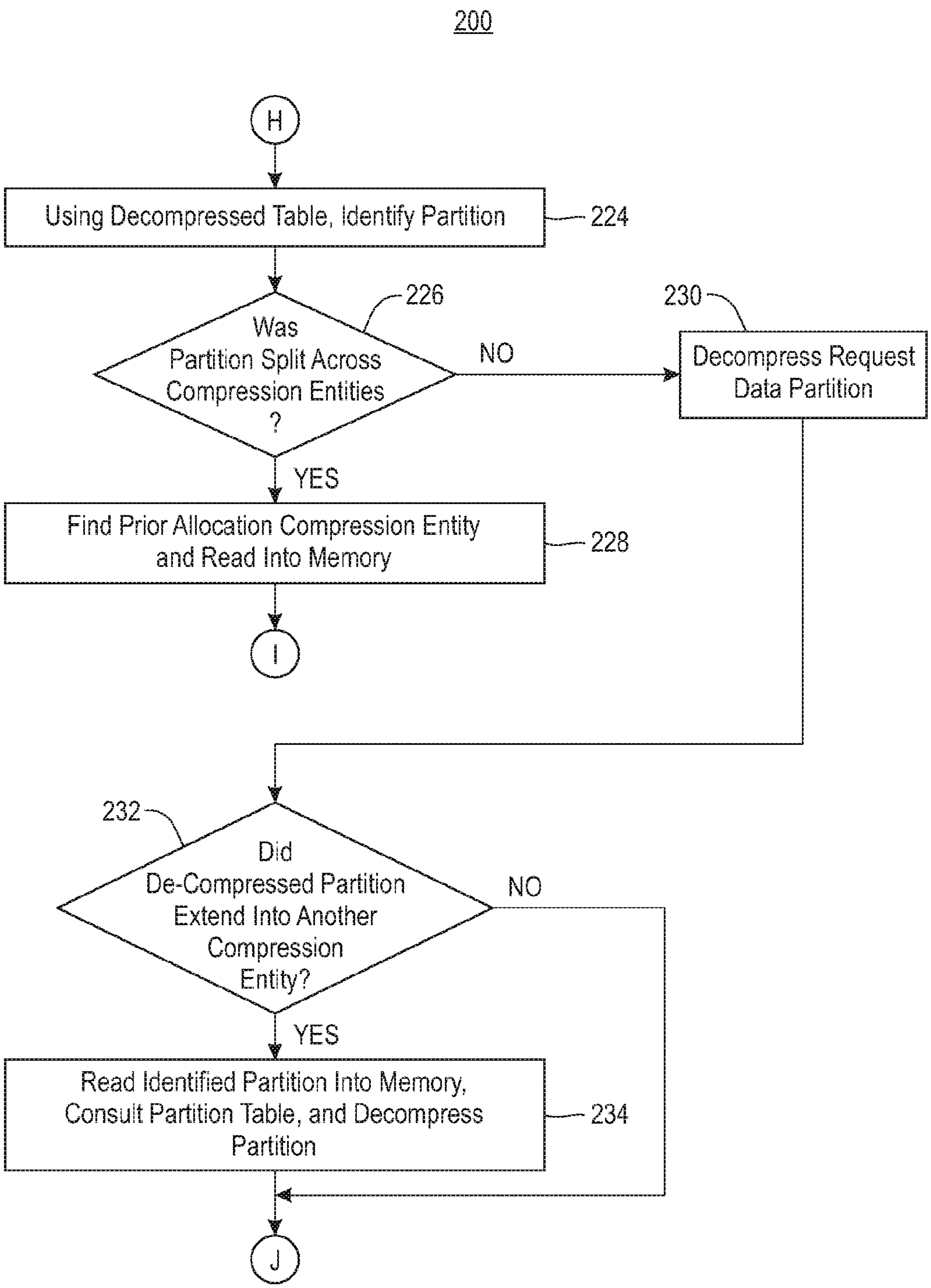

Referring to FIGS. 2A-2B, a flow chart (200) is provided illustrating a process for performing a random read operation associated with data subject to the dense packing compression shown and described in FIGS. 1A-1D. A request to read data for a compression entity is received (202). The read request may include location metadata corresponding to the data to be read. The variable X is assigned to the first block of the read request (204). The file system structure, such as an inode, is consulted to find the disk address for data $block_X$ (206). As shown in FIGS. 1A-1D, the file system stores the disk address for each partition together with the reserved bit, if any, to identify the compression entity.

Based on the inode entry, it is determined if the file system entry has a compression bit set for the disk address (208). A negative response to the determination at step (208) is an indication that the data was not subject to compression, and as such the requested data is returned to the caller (210). Following the data return, it is determined if the data block read at step (204) was the last data block associated with the read request (212). A positive response to the determination at step (212) is followed by a conclusion of the read request. However, a negative response to the determination at step (212) is followed by an increment of the block counting variable, X, (214), and a return to step (206). If at step (208) the file system shows a compression bit for the subject data block, it is determined if the file system shows a cNULL address associated with an inode entry for the data block (216). The cNULL is a NULL with a compression bit, and as such as identified as part of a compression group. A NULL address without the compression bit is not a part of the compression group. As shown in FIGS. 1A-1D, a cNULL entry in the inode demonstrates that the associated block is a member of a compression group but is not the first member entry of the compression group. A positive response to the determination at step (216) is followed by looking for the prior allocated block with a disk address in the compression group that is the subject of the read request, and reading that block into memory (218). In one embodiment, the prior allocated block may not be an adjacently position block. As such, the process continues to search in the inode for the first block representing the subject compression group. A negative response at step (216) is followed by reading the $block_X$ into memory (220). Once the first block of the compression group has been identified in the inode, as demonstrating herein following either step (218) or (220), the compression entity is located and the associated partition table with the compression entity is located, read into memory, and decompressed (222).

Once the table has been decompressed, the partition that is the subject of the read request is identified in the table (224). As described in FIGS. 1A-1D, a compression group may be split across two or more compression entities. As such, following step (224), it is determined if the partition for the subject data block was split across compression entities (226). A positive response to the determination at step (226) is followed by finding the prior allocated compression entity and reading it into memory (228) and a returning to step (222). However, a negative response to the determination at step (226) is followed by decompressing the request data partition (230). It is then determined if the decompressed partition at step (230) extends into another compression entity (232), which in one embodiment may be an adjacently position compression entity. A positive response to the determination at step (232) is following by reading the identified compression entity read into memory, consulting the associated partition table, and decompressing the rest of the partition (234), and followed by a return to step (212). In the same context, a negative response to the determination at step (232) is followed by a return to step (212). Accordingly, the process of supporting the read request as shown herein continues until the last block that is the subject of the read request has been read.

Figure 3:
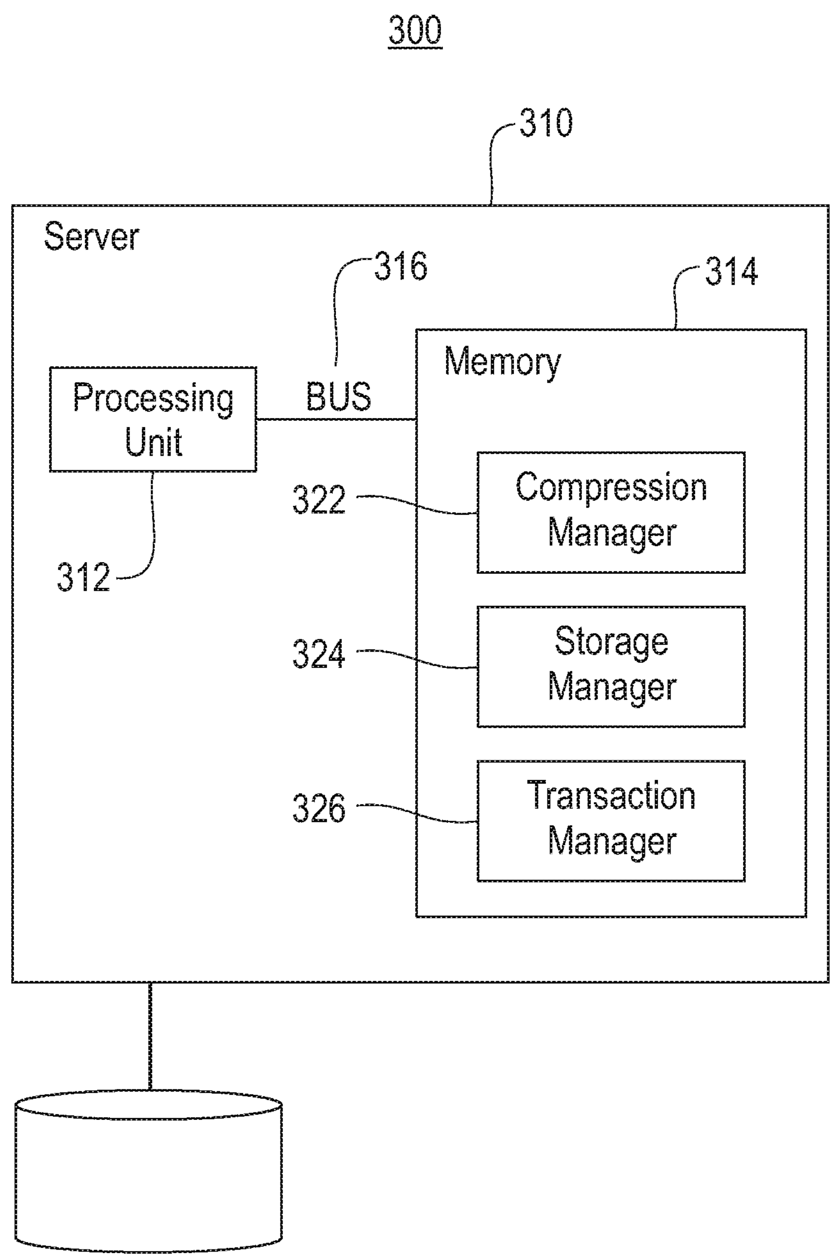
FIG. 3 depicts a block diagram illustrating a data storage system for performing the processes described above in FIGS. 1A-1D and 2A-2B.

As shown in FIGS. 1A-1D and 2A-2B, methods are provided to demonstrate processes for data compression and support of a read request. With reference to FIG. 3, a block diagram (300) is provided illustrating a data storage system for performing the processes described above in FIGS. 1A-1D and 2A-2B. The data storage system may run on one or more servers (310) that include a processing unit (312) in communication with memory (314) across a bus (316).

A set of tools are provided in communication with the processing unit (312) to support data compression, including management of both data compression associated with data storage, and reading and writing the compressed data. In one embodiment, the tools include: a compression manager (322), a storage manager (324), and a transaction manager (326). The compression manager (322) is provided to perform compression on raw data, the storage manager (324) is provided to store compressed data into compression entities, as shown and described in FIGS. 1A-1D, and the transaction manager (326) is provided to support a data transaction, such as a read request requiring one or more compressed data storage blocks, as shown and described in FIGS. 2A-2B.

The compression manager (322) compresses a data block if it is deemed compressible, and the storage manager (324) writes the compressed data block to a first compression entity at an offset. In one embodiment, the storage manager allocates the data block to a disk address corresponding to the first compression entity prior to the compression. The compression manager (322) updates an in-memory table associated with the first compression entity, for example, by setting the offset of the compressed block in the table. If the first compression entity has sufficient space for an additional compressed data block, the compression manager (322) compresses an additional data block, and the storage manager (324) writes the data block to the first compression entity. In one embodiment, the storage manager (324) allocates a disk address for the additional data block to cNULL prior to the compression of the additional data block. If the first compression entity does not have sufficient space for an additional compressed data block (i.e., the first compression entity is full), the storage manager (324) proceeds to store the table. In one embodiment, the compression manager (322) compresses the table, and the storage manager (324) stores the table in the associated compression entity.

To ensure space for the table, the storage manager (324) assesses a size of the compressed table and compares the assessed size to the first compression entity to determine if the assessed size exceeds a size of the last compressed block stored in the associated compression entity. Depending on space availability, the storage manager (324) may either store the table in the compression entity, or remove data from the compression entity together with the entry in the table to make room for storage of the table in the compression entity. More specifically, the removal of the data includes removal of the entry corresponding to the last block from the in-memory table, and the compression manager (322) re-compresses the modified table. Once space has been made available for the table in the compression entity and the table is stored therein, the in-memory table is reset so that it may be used for a second compression entity. In one embodiment, the storage manager (324) resets the in-memory table, which may include marking the in-memory table with respective offsets within the first and second compression entities in order to update the positions of corresponding data objects. The compression manager (322) determines if there are any uncompressed blocks remaining and, if so, the storage manager (324) allocates the next uncompressed block to repeat the compression process.

In addition to maintaining and managing the table, the storage manager (324) communicates with the file system. More specifically, the compression of data and the location of the compressed data are reflected in a file system data structure, such as an inode. As shown in FIGS. 1A-1D, each processed data block is either compressed or not compressed, with the status of the blocks maintained in their associated entry in the inode. At the same time, any associated compression bit and cNULL entry is also reflected in the inode. Accordingly, the storage manager (324) functions to maintain and/or manage the in-memory table and the associated inode(s).

As discussed above, the transaction manager (326) is provided to satisfy transaction requests requiring one or more compressed data storage blocks. In response to receipt of a read request, the transaction manager (326) looks-up a disk address for a compression entity. In one embodiment, the read request includes location metadata, and the compression entity is looked-up from the location metadata. For example, the disk address may be looked-up in an inode or other related data structure. The transaction manager (326) then performs decompression, in the manner discussed above in FIGS. 2A-2B. Accordingly, the transaction manager (326) is provided to satisfy data transactions involving compressed data.

As identified above, the compression manager (322), storage manager (324), and transaction manager (326), hereinafter referred to as tools, function as elements to support data compression. The tools (322)-(326) are shown in the embodiment of FIG. 3 as residing in memory (314) local to the server (310). However, in alternative embodiments, the tools (322)-(326) may reside as hardware tools external to the memory (314), or they may be implemented as a combination of hardware and software. Similarly, in one embodiment, the tools (322)-(326) may be combined into a single functional item that incorporates the functionality of the separate items. As shown herein, each of the tools (322)-(326) are shown local to the data storage server (310). However, in one embodiment they may be collectively or individually distributed across a network or multiple machines and function as a unit to support data compression. Accordingly, the tools may be implemented as software tools, hardware tools, or a combination of software and hardware tools.

Figure 4:
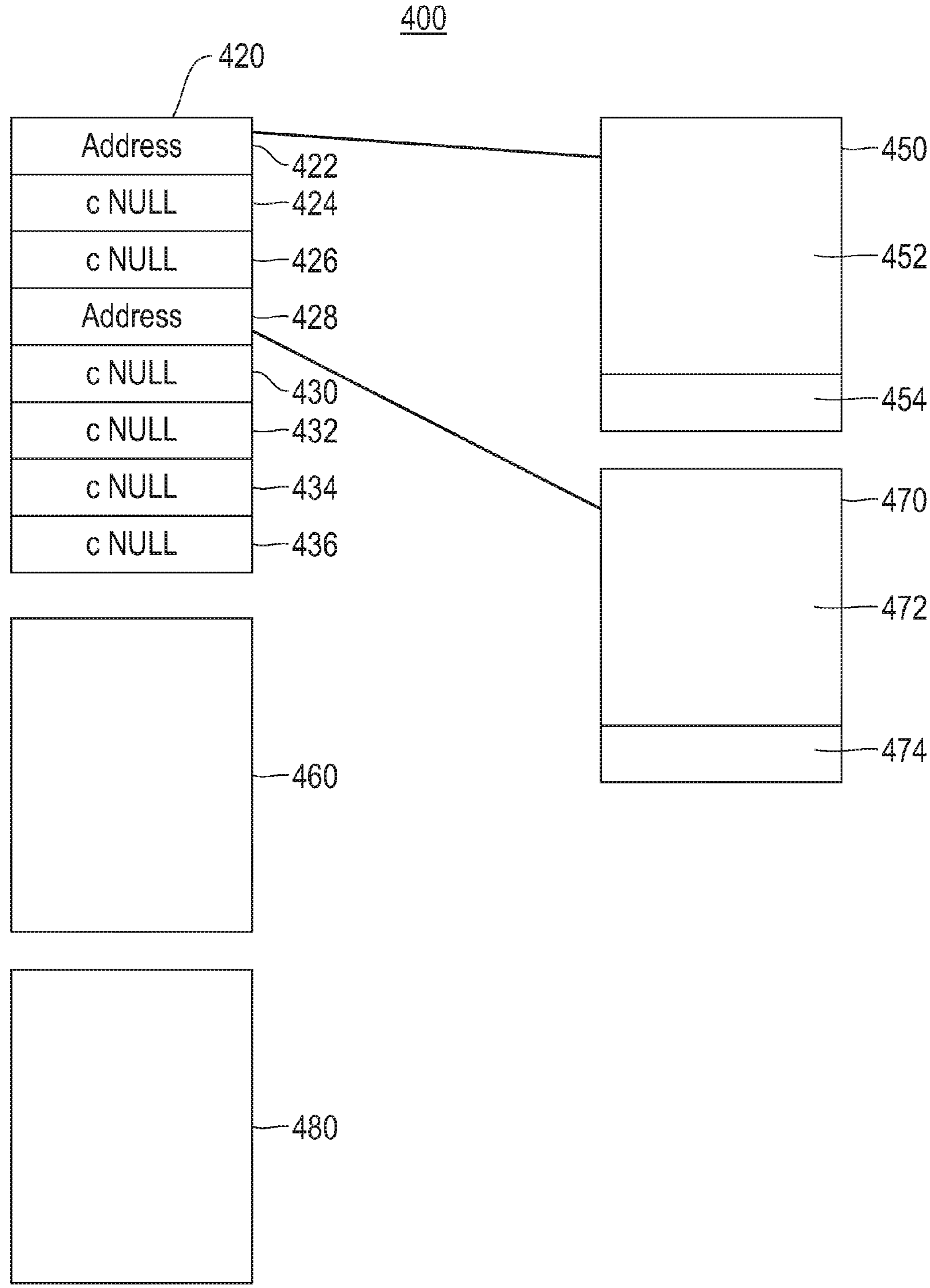
FIG. 4 depicts a block diagram illustrating compression entities as related to the file system.

With reference to FIG. 4, a block diagram (400) is provided illustrating the compression entities as related to the file system. As shown, the file system (410) is shown herein with several inodes (420), (460), and (480), although only one inode will be described in detail for ease of description. In the example shown herein, inode (420) is mapped to two compression entities (450) and (470), although the quantity of compression entities should not be considered limiting. Compression entity (450) is shown with compressed data partitions (452), and an associated compression table (454). Similarly, compression entity (470) is shown with compressed data partitions (472), and an associated compression table (472). In relation to the inode (420), there is a plurality of entries. More specifically, entry (422) includes an address that identifies compression entity (450) and also includes a compression bit associated with this compression entity. Similarly, entry (428) includes an address that identifies compression entity (470) and also includes a compression bit associated with this compression entity. There are several entities shown with cNULL, specifically, entries (424)-(426) and entities (430)-(436). The cNULL entries at (424)-(424) are members of compression entity (450), and the cNULL entries at (430)-(436) are members of compression entity (470).

Figure 5:
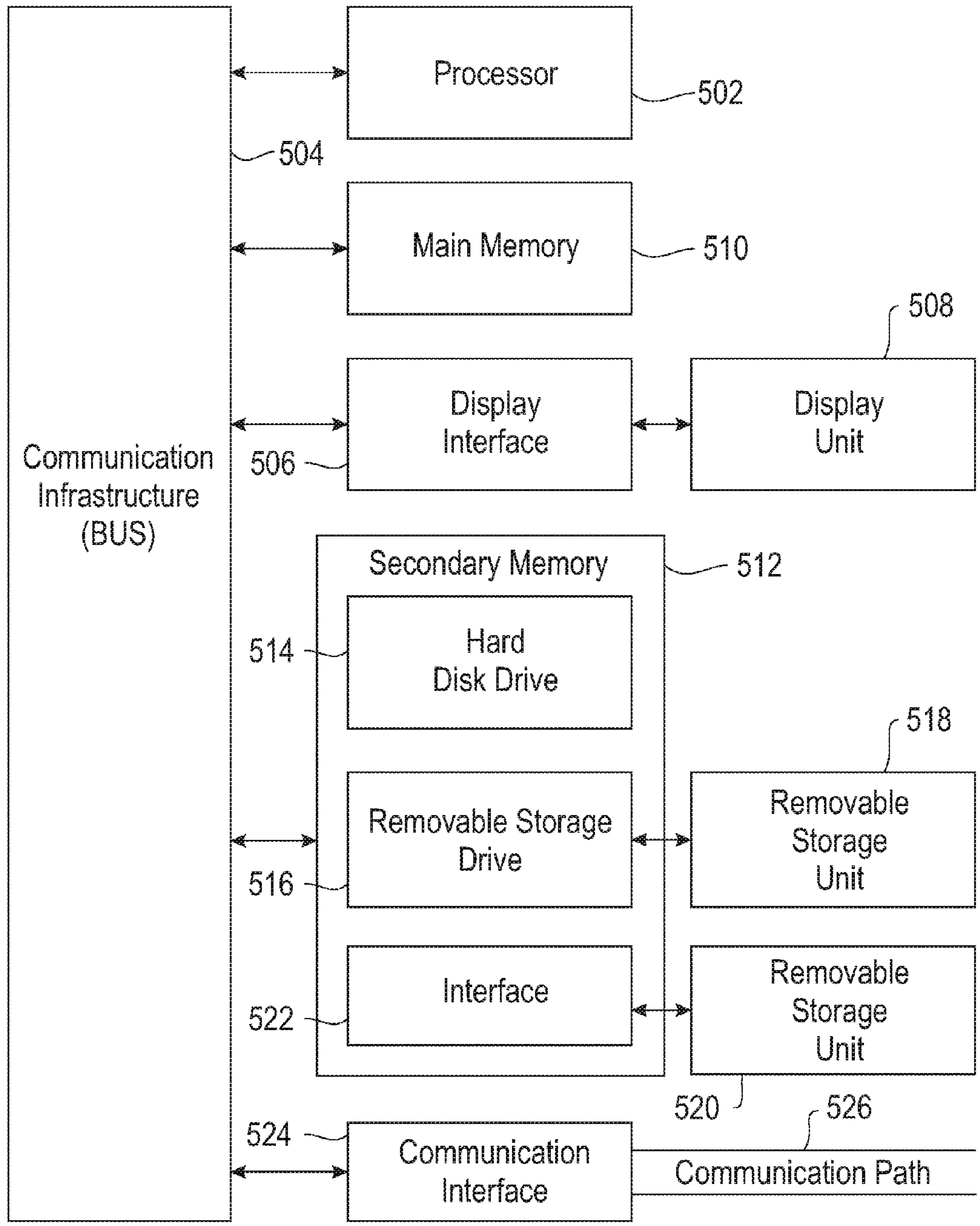
FIG. 5 depicts a block diagram showing a system for implementing the tools of FIG. 3.

In the example shown in FIG. 4, the compression entities are densely packed. This mitigates, or eliminates, fragmentation, and at the same time makes reading data efficient. With reference to FIG. 5, a block diagram (500) is provided illustrating an exemplary system for implementing the data compression and storage, as shown and described in the flow charts of FIGS. 1A-1D and 2A-2B. The computer system includes one or more processors, such as a processor (502). The processor (502) is connected to a communication infrastructure (504) (e.g., a communications bus, cross-over bar, or network).

The computer system can include a display interface (506) that forwards graphics, text, and other data from the communication infrastructure (504) (or from a frame buffer not shown) for display on a display unit (508). The computer system also includes a main memory (510), preferably random access memory (RAM), and may also include a secondary memory (512). The secondary memory (512) may include, for example, a hard disk drive (514) and/or a removable storage drive (516), representing, for example, a floppy disk drive, a magnetic tape drive, or an optical disk drive. The removable storage drive (516) reads from and/or writes to a removable storage unit (518) in a manner well known to those having ordinary skill in the art. Removable storage unit (518) represents, for example, a floppy disk, a compact disc, a magnetic tape, or an optical disk, etc., which is read by and written to by removable storage drive (516). As will be appreciated, the removable storage unit (518)

includes a computer readable medium having stored therein computer software and/or data.

In alternative embodiments, the secondary memory (512) may include other similar means for allowing computer programs or other instructions to be loaded into the computer system. Such means may include, for example, a removable storage unit (520) and an interface (522). Examples of such means may include a program package and package interface (such as that found in video game devices), a removable memory chip (such as an EPROM, or PROM) and associated socket, and other removable storage units (520) and interfaces (522) which allow software and data to be transferred from the removable storage unit (520) to the computer system.

The computer system may also include a communications interface (524) which allows software and data to be transferred between the computer system and external devices. Examples of communications interface (52) may include a modem, a network interface (such as an Ethernet card), a communications port, or a PCMCIA slot and card, etc. Software and data transferred via communications interface (524) is in the form of signals which may be, for example, electronic, electromagnetic, optical, or other signals capable of being received by communications interface (524). These signals are provided to communications interface (524) via a communications path (i.e., channel) (526). This communications path (526) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (510) and secondary memory (512), removable storage drive (516), and a hard disk installed in hard disk drive (514).

Computer programs (also called computer control logic) are stored in main memory (510) and/or secondary memory (512). Computer programs may also be received via a communication interface (524). Such computer programs, when run, enable the computer system to perform the features of the present embodiments as discussed herein. In particular, the computer programs, when run, enable the processor (502) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A system comprising:

a processing unit in communication with memory; and one or more tools in communication with the processing unit, the tools to support data compression, the tool to:

compress a first partition of a first data block of a compression group;

store the compressed first partition in a first compression entity;

maintain an in-memory table, including the tool to update the in-memory table with data associated with an address of the stored compressed first partition;

in response to a determination that the first compression entity is full, compress the in-memory table; and write the compressed table to the first compression entity.

2. The system of claim 1, further comprising the tool to set a compression bit for the compressed first partition with the address of the first compressed partition and, in response to a determination that the first compression entity has space for an additional partition, compress a second partition of the first data block, store the compressed second partition in the first compression entity, and update the in-memory table with data associated with a location of the stored compressed second partition.

3. The system of claim 2, further comprising the tool to compress a second data block of the compression group and store the second compressed block in the first compression entity, and update the in-memory table, including the tool to store a cNULL entry for an address of the second compressed data block.

4. The system of claim 1, wherein writing the compressed table to the first compression entity further comprises the tool to:

assess a size of the compressed table, and compare the assessed size of the compressed table to a size of a last compressed block in the first compression entity;

in response to the assessed size of the compressed table being less than the size of the last compressed block:

decompress the compressed table;

remove the last compressed block from the first compression entity and a corresponding entry from the in-memory table;

re-compress the in-memory table; and store the re-compressed table in space in the first compression entity created from the removed block; and in response to the assessed size of the compressed table exceeding the size of the compressed block:

decompress the compressed table;

split the partition of the last compressed block, including the tool to move select compressed data from the first compression entity to a second compression entity;

remove a corresponding entry in the in-memory table, re-compress the in-memory table, and store the re-compressed table in the last compressed block of the first compression entity; and reset a second in-memory table, including the tool to mark a first address in the reset table to identify an offset of the split partition in the first compressed partition.

5. The system of claim 1, further comprising the tool to process a read request, including the tool to:

identify a disk address for a data block subject to the read request;

in response to finding that the identified disk address has a compression bit:

locate an associated compression entity storing the data block subject to the read request, and decompress a compressed table associated with the located compression entity;

look-up a location of the data block subject to the read request in the decompressed table;

decompress the data block subject to the read request based on the looked-up location; and return the decompressed data;

in response to finding that the identified disk address is compressed NULL (cNULL), employ the compression bit and locate an allocated data block, wherein the allocated data block represents a start of the compression group; and in response to ascertaining that the data block subject to the read request contains data spanning from the first compression entity into a second compression entity:

locate the second compression entity and decompress a second compressed table associated with the second compression entity;

look-up a location of the data subject to the read request in the decompressed second table;

decompress the data block subject to the read request based on the looked-up location; and return the decompressed data.

6. A computer program product comprising a computer readable storage medium having computer readable program code embodied therewith, the program code being executable by a processor to:

compress a first partition of a first data block of a compression group;

store the compressed first partition a first compression entity;

maintain an in-memory table, including the tool to update the in-memory table with data associated with an address of the stored compressed first partition;

in response to a determination that the first compression entity is full, compress the in-memory table; and write the compressed table to the first compression entity.

7. The computer program product of claim 6, further comprising program code to set a compression bit for the compressed first partition with the address of the first compressed partition and, in response to a determination that the first compression entity has space for an additional partition, compress a second partition of the first data block, store the compressed second partition in the first compression entity, and update the in-memory table with data associated with a location of the stored compressed second partition.

8. The computer program product of claim 7, further comprising program code to compress a second data block of the compression group and store the second compressed block in the first compression entity, and update the in-memory table, including the tool to store a cNULL entry for an address of the second compressed data block.

9. The computer program product of claim 6, wherein writing the compressed table to the first compression entity further comprises program code to assess a size of the compressed table, and compare the assessed size of the compressed table to a size of a last compressed block in the first compression entity.

10. The computer program product of claim 9, further comprising program code to:

in response to the assessed size of the compressed table being less than the size of the compressed block:

decompress the compressed table;

remove the last compressed block from the first compression entity and a corresponding entry from the in-memory table;

re-compress the in-memory table; and store the re-compressed table in space in the first compression entity created from the removed block; and in response to the assessed size of the compressed table exceeding the size of the compressed block:

decompress the compressed table;

split the partition of the last compressed block, including program code to move select compressed data from the first compression entity to a second compression entity;

remove a corresponding entry in the in-memory table, re-compress the in-memory table, and store the re-compressed table in the last compressed block of the first compression entity;

reset a second in-memory table, including the tool to mark a first address in the reset table to identify an offset of the split partition in the first compressed partition.

11. The computer program product of claim 6, further comprising program code to process a read request, including program code to:

identify a disk address for a data block associated with the read request;

in response to finding that the identified disk address has a compression bit:

locate an associated compression entity storing the data block subject to the read request, and decompress a compressed table associated with the located compression entity;

look-up a location of the data block subject to the read request in the decompressed table;

decompress the data block subject to the read request based on the looked-up location; and return the decompressed data; and in response to finding that the identified disk address is compressed NULL (cNULL), employ the compression bit and locate an allocated data block, wherein the allocated data block represents a start of the compression group.

12. The computer program product of claim 11, further comprising program code to ascertain that the data block subject to the read request contains data spanning from the first compression entity into a second compression entity:

locate the second compression entity, and decompress a second compressed table associated with the second compression entity;

look-up a location of the data subject to the read request in the decompressed second table;

decompress the data block subject to the read request based on the looked-up location; and return the decompressed data.

13. A method comprising:

compressing a first partition of a first data block of a compression group;

storing the compressed first partition in a first compression entity;

maintaining an in-memory table, including updating the in-memory table with data associated with an address of the stored compressed first partition;

in response to determining that the first compression entity is full, compressing the in-memory table; and writing the compressed table to the first compression entity.

14. The method of claim 13, further comprising setting a compression bit for the compressed first partition with the address of the first compressed partition, and in response to a determination that the first compression entity has space for an additional partition, compressing a second partition of the first data block, storing the compressed second partition in the first compression entity, and updating the in-memory table with the second compressed partition.

15. The method of claim 14, further comprising compressing a second data block of the compression group and storing the second compressed block in the first compression entity, and updating the in-memory table, including storing a cNULL entry for an address of the second compressed data block.

16. The method of claim 13, further comprising, in response to the assessed size of the compressed table being less than the size of a last compressed block, decompressing the compressed table, removing the last compressed block from the first compression entity and a corresponding entry from the in-memory table, re-compressing the in-memory table, and storing the re-compressed table in space in the first compression entity created from the removed block.

17. The method of claim 13, further comprising, in response to the assessed size of the compressed table exceeding the size of the compressed block:

decompressing the compressed table;

splitting the partition of a last compressed block, including moving select compressed data from the first compression entity to a second compression entity;

removing a corresponding entry in the in-memory table, re-compressing the in-memory table, and storing the re-compressed table in the last compressed block of the first compression entity; and resetting a second in-memory table for the second compression entity, including marking a first address in the reset table to identify an offset of the split partition in the compressed first partition.

18. The method of claim 13, further comprising processing a read request, including:

identifying a disk address for a data block subject to the read request;

in response to finding that the identified disk address has a compression bit, locating an associated compression entity storing the data block subject to the read request, and decompressing a compressed table associated with the located compression entity;

looking-up a location of the data block subject to the read request in the decompressed table;

decompressing the data block subject to the read request based on the looked-up location; and returning the decompressed data.

19. The method of claim 18, further comprising, in response to finding that the identified disk address is compressed NULL (cNULL), employing the compression bit and locating an allocated data block, wherein the allocated data block represents a start of the compression group.

20. The method of claim 18, further comprising, in response to ascertaining that the data block subject to the read request contains data spanning from the first compression entity into a second compression entity:

locating the second compression entity and decompressing a second compressed table associated with the second compression entity;

looking-up a location of the data subject to the read request in the decompressed second table;

decompressing the data block subject to the read request based on the looked-up location; and returning the decompressed data.

* * * * *